(12) United States Patent
Bentley

(10) Patent No.: US 6,922,323 B1
(45) Date of Patent: Jul. 26, 2005

(54) PROTECTION CIRCUITRY FOR A SUBSCRIBER LINE INTERFACE CIRCUIT (SLIC) ARRANGEMENT

(75) Inventor: Ronald L. Bentley, Santa Rosa, CA (US)

(73) Assignee: Alcatel, Paris (FR)

(*) Notice: Subject to any disclaimer, the term of this patent is extended or adjusted under 35 U.S.C. 154(b) by 343 days.

(21) Appl. No.: 10/321,253

(22) Filed: Dec. 17, 2002

(51) Int. Cl.[7] ............................................. H01C 7/12
(52) U.S. Cl. ...................................................... 361/119
(58) Field of Search ........................................ 361/119

(56) References Cited

U.S. PATENT DOCUMENTS

| | | | |
|---|---|---|---|
| 4,408,248 A | 10/1983 | Bulley et al. | |
| 4,467,310 A | 8/1984 | Jakab | |
| 4,577,255 A | 3/1986 | Martin | |
| 4,585,905 A * | 4/1986 | Brown | 379/412 |
| 4,661,878 A * | 4/1987 | Brown et al. | 361/56 |
| 4,661,979 A * | 4/1987 | Jakab | 379/412 |
| 4,695,916 A | 9/1987 | Satoh et al. | |
| 4,709,296 A | 11/1987 | Hung et al. | |
| 4,720,845 A | 1/1988 | Lechner et al. | |
| 4,849,846 A * | 7/1989 | Hung et al. | 361/56 |
| 4,947,427 A | 8/1990 | Rosch et al. | |
| 5,146,384 A | 9/1992 | Markovic et al. | |
| 5,936,823 A * | 8/1999 | Kok | 361/119 |
| 6,040,972 A * | 3/2000 | Takeuchi | 361/119 |
| 6,298,134 B1 * | 10/2001 | Curry | 379/412 |
| 2003/0053276 A1 * | 3/2003 | Mutunga et al. | 361/119 |

* cited by examiner

Primary Examiner—Brian Sircus
Assistant Examiner—James A Demakis
(74) Attorney, Agent, or Firm—Danamraj & Youst PC; Bobby D. Slaton; V. Lawrence Sewell

(57) ABSTRACT

In one embodiment, an overvoltage protection circuit is disclosed for decoupling a voltage source available at a Subscriber Line Interface circuit (SLIC) from a subscriber loop line conductor when the voltage source is shorted to the conductor in a non-ringing condition. In another embodiment, a multi-point protection apparatus is provided for protecting a SLIC against transients having different levels.

27 Claims, 3 Drawing Sheets

PROTECTION CIRCUITRY FOR A SUBSCRIBER LINE INTERFACE CIRCUIT (SLIC) ARRANGEMENT

BACKGROUND OF THE INVENTION

1. Technical Field of the Invention

The present invention generally relates to telecommunications network equipment. More particularly, and not by way of any limitation, the present invention is directed to protective circuitry with respect to a Subscriber Line Interface Circuit (SLIC).

2. Description of Related Art

Subscriber Line Interface Circuits (SLICs)are employed to provide an interface between a low voltage signal path in a telephone central office (CO) and a high voltage telephone subscriber line. The SLIC provides functions such as off-hook detection, ringing, signaling generation and battery feed to the subscriber line. The subscriber line consists of a telephone transmission line, including two conductors referred to as A and B or TIP and RING, and the subscriber telephone equipment coupled therebetween. The subscriber line and the subscriber telephone equipment are also referred to as a subscriber loop.

The SLIC provides power from the telephone CO, or a remote office, to the subscriber line in response to a received battery voltage. Whereas single supply SLICs have been used traditionally, SLICs with multiple power supplies (e.g., dual supplies) are becoming commonplace in today's access networks. Typically, a high positive voltage source is used as one power supply and a negative voltage source provided by a battery is used as the other power supply. Using such a power supply scheme, a differential voltage signal of a substantially high magnitude necessary for balanced ringing may be developed.

One of the potential hazards of implementing a high positive voltage source is that when the SLIC is electrically damaged for any reason, one of the TIP/RING terminals may be shorted to the voltage source. As a consequence, the subscriber loop conductor(s) may carry a dangerous voltage level to subscriber premises even in a non-ringing condition, thereby violating applicable safety standards (e.g., the UL standards). Another concern with respect to SLICs used in conjunction with sensitive Digital Subscriber Line (DSL) circuitry is the need to comply with the transient tests specified in GR-1089 while still protecting the DSL circuitry against overvoltage conditions. Solutions that address these and other shortcomings are either nonexistent or, where available, generally deficient in terms of high cost and the requirement of additional components and board space.

SUMMARY OF THE INVENTION

Accordingly, the present disclosure provides protective circuitry arrangements that advantageously overcome these and other shortcomings and deficiencies. In one aspect, the present invention is directed to an overvoltage protection circuit wherein a subscriber loop line conductor is protected from high voltage shorting in a non-ringing condition. In an exemplary embodiment, the protection circuit includes a fusing or switching or resistive element (collectively, "open circuit element") coupled to a SLIC's terminal that corresponds to the subscriber loop line conductor. A protection device, which can be implemented as a solid-state silicon-controlled rectifier (SCR) circuit arrangement, is disposed between the open circuit element and a protected ground for providing a current path to the ground under appropriate biasing conditions. A biasing circuit portion is included in order to bias a control gate terminal of the protection device such that when a voltage source (e.g., a potentially harmful positive supply at the SLIC) is shorted to the subscriber loop line conductor, the protection device transitions into a low impedance conductive state for drawing a current through the open circuit element which is sufficient to "blow open" or "switch open" the element. Accordingly, the voltage source is permanently decoupled from the subscriber loop line conductor until after the shorting condition is removed or repaired.

In another aspect, the present invention is directed to a multi-point protection apparatus for protecting a SLIC against transients having different levels, wherein the SLIC is operable to service a subscriber loop carrying both voice signals as well as Digital Subscriber Line (DSL) signals superimposed thereon. Depending on the transient levels against which protection is sought, one or more biasing circuit portions are provided for firing a protection device at different voltage reference points, which protection device may be coupled to one or more conductors of the subscriber loop serviced by the SLIC. When a transient having a particular level is imposed on the subscriber loop conductor, one of the biasing circuits drives the control gate terminal of the protection device so that it is placed in a low impedance conductive state, thereby protecting the sensitive SLIC components as well as DSL circuitry.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
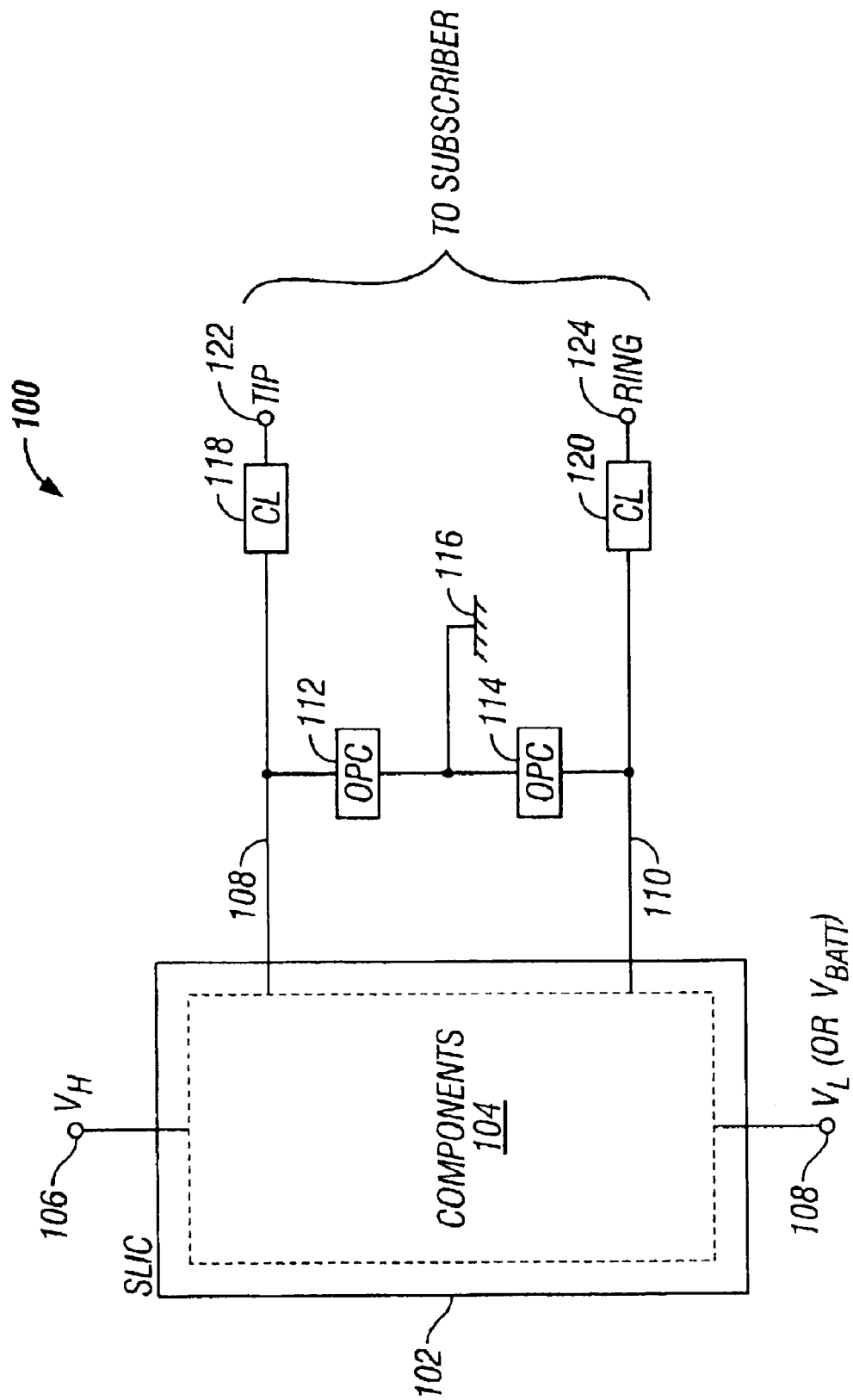
FIG. 1 depicts an exemplary embodiment of a SLIC overvoltage protection circuitry system wherein the teachings of the present invention may be practiced.

Presently preferred exemplary embodiments of the invention will now be described with reference to various illustrations of how the invention can best be made and used. Like reference numerals are used throughout the description and several views of the drawings to indicate like or corresponding parts, wherein the various elements are not necessarily drawn to scale.

Referring now to the drawings, and more particularly to FIG. 1, there is shown an exemplary embodiment of a SLIC overvoltage protection circuitry system 100 wherein the teachings of the present invention may be practiced. A known or heretofore unknown SLIC 102 is operable to service at least one subscriber loop comprising a TIP conductor 122 and a RING conductor 124 that extend to subscriber premises. One or more voltage supplies are provided for powering the SLIC's internal components 104 as well as for carrying out the SLIC's functionality. For instance, a positive voltage source ($V_H$) 106 and a negative voltage source ($V_L$ or $V_{BATT}$) 108 are provided in the exemplary embodiment depicted in FIG. 1. SLIC 102 is provided with terminals 108 and 110 that are coupled to the subscriber loop line conductors for effectuating the conductive relationship between the SLIC circuitry and the subscriber loop. By way of illustration, terminal 108 is coupled to the TIP conductor 122 via a current limiter (CL) 118 and terminal 110 is coupled to the RING conductor 124 via a current limiter (CL) 120. Accordingly, for purposes of the present invention, terminals 108 and 110 may generally be referred to as TIP/RING terminals.

In one exemplary implementation, the two supply voltages can nominally be about 87 V ($V_H$) and −52 V ($V_L$), which can be used differentially to develop a peak-to-peak signal on the subscriber loop of a substantially high magnitude that may be necessary for ringing in some of the state-of-the=art subscriber loop arrangements.

As alluded to in the Background section of the present patent application, either of the TIP/RING terminals may be shorted to one or more of the power supplies of the SLIC when the SLIC circuitry itself has been electrically damaged due to an overstress, e.g., a lightning surge, power cross, or power induction, and the like. For instance, the 87 V supply could be shorted to either the TIP or RING terminal, with the −52 V supply connected to the other terminal of the loop. When shorted to a positive voltage source, however, the subscriber loop line conductor carries a high enough voltage even in a non-ringing condition that gives rise to a potential electrical hazard at subscriber premises. In accordance with the teachings of the present invention, therefore, an overvoltage protection circuit (OPC) is provided with either or both of the conductors of the subscriber loop whereby the shorted conductor is decoupled from its SLIC terminal under appropriate circumstances. Reference numeral 112 refers to an OPC arrangement disposed between the TIP terminal 108 and a protected ground 116 for protecting the TIP conductor 122 under overvoltage shorting conditions. Likewise, another OPC arrangement 114 may be provided for protecting the RING conductor 124 wherein a high voltage appearing on the RING terminal 110 in a non-ringing condition is shunted to the protected ground 116.

Figure 2:
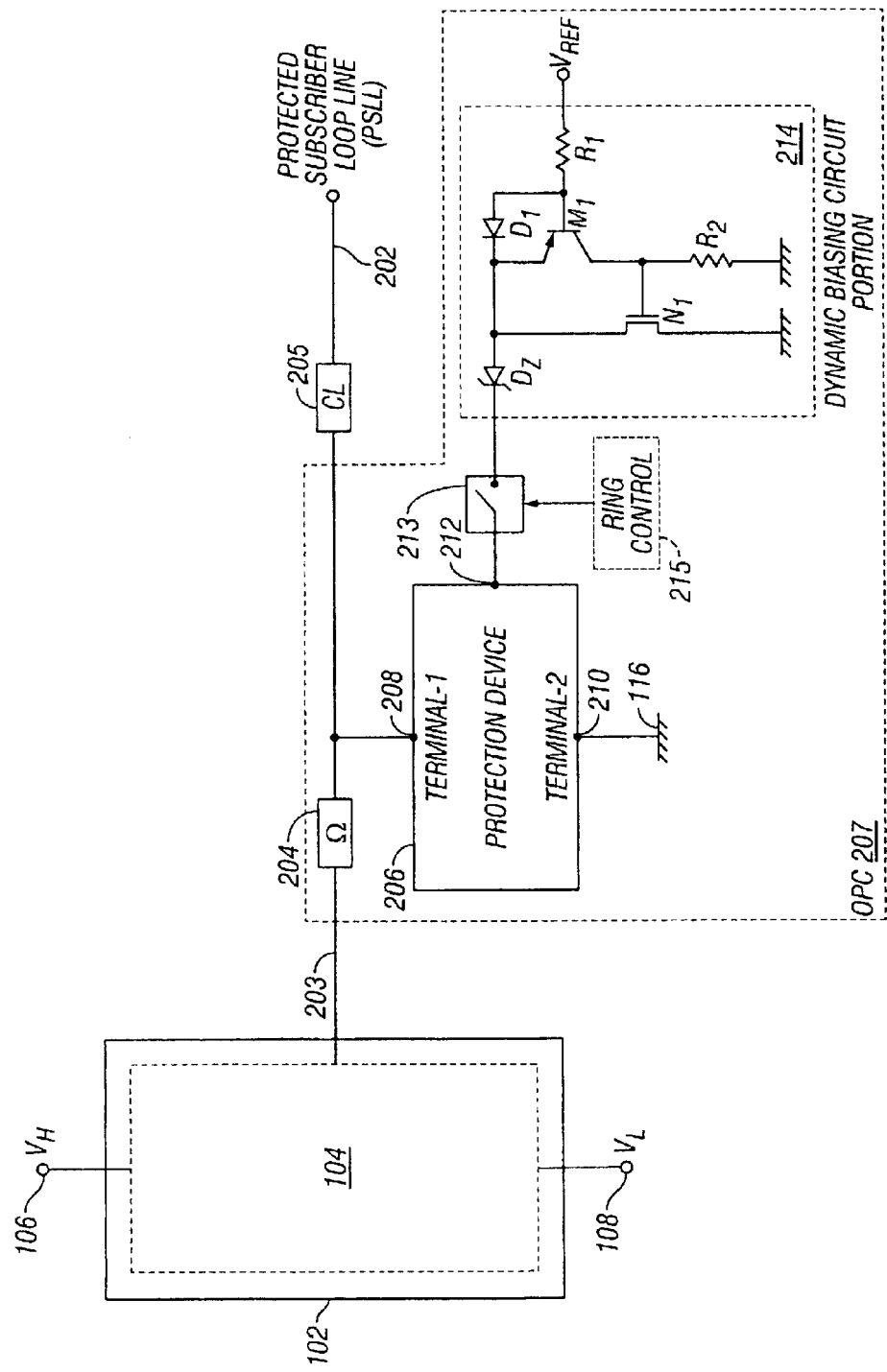
FIG. 2 depicts an exemplary overvoltage protection circuit provided in accordance with one embodiment of the present invention for protecting a subscribe loop line conductor when it is shorted to a supply voltage.

FIG. 2 depicts an exemplary overvoltage protection circuit 207 provided in accordance with one embodiment of the present invention for protecting a subscribe loop line conductor when it is shorted to a voltage source available at SLIC 102. Reference numeral 202 refers to a protected subscriber loop line (PSLL) which can be either of the TIP/RING conductors. In similar fashion, reference numeral 203 refers to a generalized terminal of the SLIC corresponding to the PSLL conductor 202, which can be shorted to a voltage source, e.g., $V_H$. Further, a generalized current limiter 205 may be provided with respect to the PSLL conductor 202 in a conventional manner.

Essentially, the OPC arrangement 207 operates to remove the shorted voltage source in order to reduce the potential on the PSLL conductor to an acceptable level in a non-ringing condition. Accordingly, a fusing element or switching element or a resistive element (collectively, "open circuit element) 204 is coupled to the SLIC terminal 203 which can be controllably "fused open" or "switched open" for decoupling the terminal 203 and the associated PSLL conductor. In one embodiment, the open circuit element may include, e.g., a resistor of low wattage. For purposes of this patent application, including the claims appended hereinbelow, the term "fusing element" will be used synonymously with an open circuit element as described herein.

A protection device 206 provided between the fusing element 204 and the protected ground 116 is disposed on the line conductor to be protected. Ideally, the protection device's operating characteristics are such that it is normally in a high impedance state, but which can be controllably transitioned into a low impedance conductive state upon application of a reference voltage (i.e., trip voltage) provided by a dynamic biasing circuit portion 214. In the conductive state, the protection device 206 operates to draw a current through the fusing element 204 that is sufficient to "blow open" the fuse and thereby decouple the SLIC 102 from the PSLL conductor 202. The harmful voltage source is therefore permanently removed from the subscriber loop until the SLIC is replaced or repaired.

In one embodiment, the protection device 206 may be implemented as a solid-state silicon-controlled rectifier (SCR) arrangement having at least one control gate terminal, at least one anode terminal and at least one cathode terminal. For example, a commercially available product called Battrax device provided by Teccor Electronics may be utilized as a protection device for purposes of the present invention. Reference numeral 208 refers to Terminal-1 that is coupled to the line conductor to be protected, reference numeral 210 refers to Terminal-2 that is coupled to the ground 116, and reference numeral 212 refers to the control gate terminal that can be controllably coupled to the dynamic biasing circuit portion 214 via a switch 213. When ringing, switch 213 decouples the protection device 206 from the biasing circuit portion 214 in response to a ringing control signal 215. The protection device is therefore maintained in a default high impedance state in normal operation. In a non-ringing condition, however, switch 213 couples the protection device 206 to the biasing circuit 214. When the voltage level at Terminal-1 208 is taken high due to the shorting of the SLIC terminal 203, that voltage is at least moderately more positive than the potential at the control gate terminal 212 and the protection device 206 will "fire" and transition into a very low impedance state. A shunting path is therefore provided for the supply voltage from the protected line (coupled to Terminal-1 208) to ground (coupled to Terminal-2 210). This condition will exist until the current through the device approaches zero.

In an exemplary implementation, the dynamic biasing circuit portion 214 may be implemented using inexpensive components such as bipolar junction transistor (BJT) devices, field-effect transistor (FET) devices, diodes and Zener diodes, and the like. By way of illustration, the base of a PNP BJT device $M_1$ is coupled via a biasing resister $R_1$ to a voltage level ($V_{REF}$), which could be substantially equal to the voltage level of the shorted supply, i.e., $V_H$ (if the subscriber line carries only POTS voice signals) or $V_{REF}$ could approximate $V_H$ level plus a superimposed level due to any xDSL signals. A diode $D_1$ is coupled between the base and emitter of the $M_1$ transistor whose collector is operable to drive the gate of a FET device $N_1$. A Zener diode $D_Z$ is operable to be coupled to the control gate terminal 212 via switch 213. The collector of $M_1$ device is also coupled to a ground via resistor $R_2$ of appropriate value. When $V_{[Terminal-1]}$ is greater than approximately $[V_H+V_Z]$, where $V_Z$ is the Zener drop across the Zener diode $D_Z$, a current flows from the control gate terminal 212 of the protection device 206 via Zener diode $D_Z$ into the base/emitter junction of the $M_1$ transistor, which is turned on by the voltage level at the base.

The collector current generated thereby drives the $N_1$ device, which may be provided as an N-channel enhancement mode FET device. It should be appreciated that both the PNP and FET devices turn on within a few nanoseconds of pulling the voltage level at Terminal-1 to the supply level. The FET device then draws a substantial current from the control gate terminal of the protection device, which thereby fires and causes Terminal-1 and Terminal-2 to "short-circuit" within a brief amount of time. As alluded to hereinabove, the protection device then pulls the current through the fuse element 204, thereby causing an open circuit condition between the SLIC terminal 203 and its associated PSLL 202.

It should be appreciated by those skilled in the art that the overvoltage protection scheme set forth above takes advantage of readily available protection device components, which are needed to protect the SLIC in any event from GR-1089 type threats, in order to implement a cost-effective solution for removing the shorted high voltage supply from a subscriber loop before it causes any harm to the subscriber. Once the protection device is fired with a DC-powered biasing circuit, it will stay fired, thereby permanently off-lining the SLIC supply. An added benefit is that by engineering the biasing circuit appropriately, an adaptive line protection mechanism may be provided for protecting the TIP/RING conductors from any external transients. The protection levels may be dynamically set to the levels necessary for signaling, which will result in a more robust system.

It will be further recognized that the overvoltage protection circuit 207 may be modified or rearranged in a number of ways wherein the constituent components, e.g., fuse elements, diodes, solid-state switching devices, etc., can be replaced, deleted, or re-engineered based on specific application requirements, so long as the broad inventive principles elucidated above are implemented in any equivalent electrical arrangement. In addition, whereas a single overvoltage protection circuit is shown with respect to one of the subscriber loop conductors, an arrangement may be provided where each of the TIP and RING conductors is provided with its own protection circuit, with appropriate biasing circuits powered by suitable reference voltages. Also, the overvoltage protection scheme of the present invention may be implemented in conjunction with a SLIC disposed at any node in an access network, e.g., a line card servicing any number of subscriber loops provided at a central office terminal, remote terminal, or both.

By way of an illustrative example, a SLIC may have a dual supply of +89 VDC and −56 VDC under normal conditions, the total differential potential being 195 VDC, wherein the line card design may impose a current limitation of about 600 mA. Depending on whether only POTS signals or POTS and xDSL signals are carried on the loop, a proper $V_{REF}$ level may be set for the biasing circuit portion. If a 0.25 W fuse element having an effective resistance of about 50 ohms is used, the power dissipation due to the firing of the protection device under a TIP/RING shorting condition will be 18 W (since $P=I^2R$ and $I=0.6$ A and $R=50\ \Omega$), which will "blow out" the fuse element very quickly.

Figure 3:
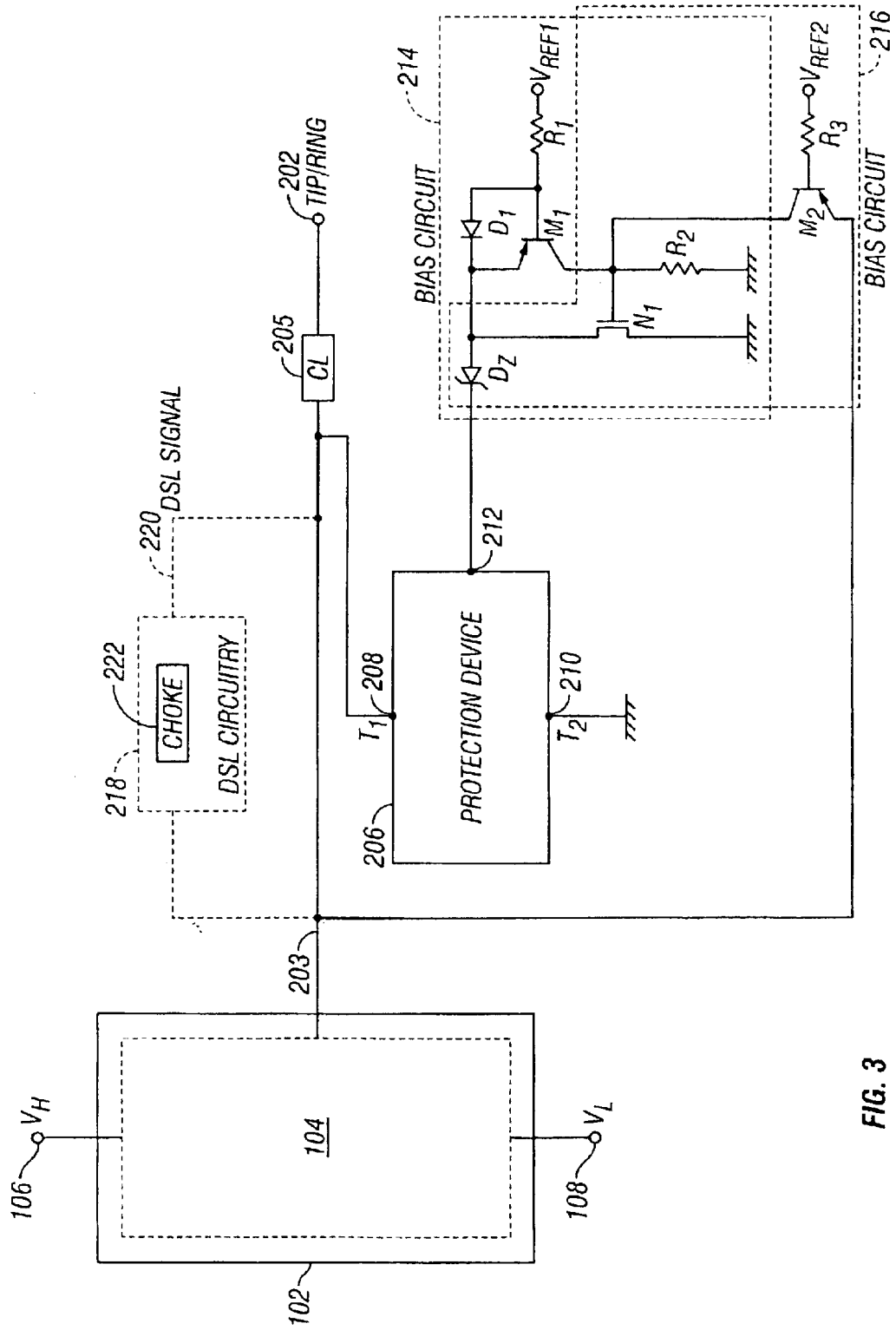
FIG. 3 depicts an exemplary multi-point protection circuit provided in accordance with one embodiment of the present invention for providing protection to a subscribe loop line conductor against transients, wherein a protective device is operable to be fired from more than one trip voltage reference point.

FIG. 3 depicts an exemplary multi-point protection circuit provided in accordance with one embodiment of the present invention for providing protection to a subscriber loop line conductor against transients, wherein a protective device is operable to be fired from more than one trip voltage reference point. The exemplary multi-point protection circuit is particularly advantageous for protecting the xDSL circuitry associated with a SLIC from high voltage transients while still meeting the POTS transient tests specified in GR-1089.

Essentially, the multi-point protection circuit of the present invention provides for the placement of a protection device at a location on the subscriber loop line in reference to the SLIC such that the protection device does not fire under normal POTS and xDSL operation (where POTS voice signals and xDSL signals are superimposed, with the resultant $V_{PEAK}$ being equal to $V_{TIP/RING}+V_{DSL}$), but still tightly protect the SLIC during transients. Accordingly, the protection device needs to be properly biased to fire at two different points in the circuit.

Similar to the overvoltage protection circuit described hereinabove, protection device 206 is disposed between TIP/RING conductor 202 and a protected ground wherein the control gate terminal 212 is operable to be driven by a first biasing circuit portion 214 having a first reference voltage ($V_{REF1}$) and at least a second biasing circuit portion 216 having a second reference voltage ($V_{REF2}$). Although the first and subsequent biasing circuit portions may share some common circuitry, it is not a necessary requirement for purposes of the present patent application. DSL circuitry 218 (combination of high pass and low pass filters, decoupling RF choke circuitry 222, et cetera) is disposed between the current limiter 205 and the SLIC's TIP/RING terminal 203, from where xDSL signals 220 would be tapped off. In the case of ADSL, the signal superimposed at this point on top of the POTS signal could be as much as 15 V–20 V higher than the POTS level. Further, instead of DSL circuitry 218, other types of circuitry (e.g., POTS circuitry) may also be provided that requires a different level of voltage protection.

In general operation, the first bias circuit 214 is operable to fire the protection device 206 when a first transient having a level greater than a first predetermined value appears at Terminal-1 208. For instance, the biasing circuitry 214 can be implemented such that the protection device 206 fires when $V_{Terminal-1}$ exceeds $V_H$ by more than 20 V, which is above the voltage levels required for normal POTS and xDSL operation. On the other hand, the second bias circuit 216, which includes a second BJT device $M_2$ whose emitter is coupled to the TIP/RING terminal 203, is operable to fire the protection device when a second transient having a level greater than a second predetermined value appears at or near the terminal 203. In the exemplary embodiment depicted, this voltage level is typically about $V_H$ plus a diode drop of 0.7 V, which is necessary to turn on the $M_2$ device when $V_{REF2}$ is approximately equal to $V_H$.

During normal operation, $V_H$ exceeds the positive potential between the SLIC and the decoupling RF circuitry. In order for the protection device 206 to fire, a current of 100 mA may have to be sunk at the control gate terminal 212. Both $M_1$ and $M_2$ devices are turned off in normal conditions. In order to turn on the $M_1$ device, the potential at the current limiter must be approximately $V_H+V_Z+$two diode drops (since the protection device may have an internal diode equivalent). Thus, when the potential at Terminal-1 208 is sufficient to turn on the $M_1$ device, its collector current will turn on the FET device (i.e., $N_1$), pulling the control gate terminal 212 to ground. Terminal-1 and Terminal-2 of the protection device 206 are then disposed in a low impedance conductive relationship, which operates to shunt the transient level safely to ground. Further, as pointed out above, when the voltage on the protected TIP/RING terminal 203 exceeds $V_H$ by about 0.7 V, the base/emitter junction of the $M_2$ device will be forward biased, thereby turning the device on. The collector of the $M_2$ device then turns on the FET device, which operates to drive the control gate terminal 212 in order to transition the protection device 206 into a low impedance state.

Based on the foregoing discussion, one skilled in the art should appreciate that the multi-point protection scheme of the present invention advantageously provides for adjustable voltage levels that can trip a protection device depending on the transients in the circuit, thereby safeguarding multiple circuit portions, e.g., POTS, xDSL and SLIC circuitry, requiring different levels of voltage protection. It is of particular benefit that the scheme can be implemented using low cost off-the-shelf parts in a robust manner that is versatile enough with respect to different applications.

Although the invention has been described with reference to certain exemplary circuit arrangements, it is to be understood that the forms of the invention shown and described are to be treated as presently preferred exemplary embodiments only. Various changes, substitutions and modifications can be realized therein without departing from the spirit and scope of the invention as defined by the appended claims.

What is claimed is:

1. An overvoltage protection circuit operable to decouple a voltage source available at a Subscriber Line Interface Circuit (SLIC) from a subscriber loop line conductor when said voltage source is shorted to said conductor in a non-ringing condition, comprising:

a fusing element coupled to said SLIC's terminal corresponding to said subscriber loop line conductor;

a protection device disposed between said fusing element and a protected ground, wherein a first terminal of said protection device is coupled to said fusing element and a second terminal of said protection device is coupled to said protected ground; and a biasing circuit portion operable to bias a control gate terminal of said protection device such that when said voltage source is shorted to said subscriber loop line conductor, said protection device is biased into a low impedance conductive state for drawing a current between its first and second terminals, wherein said current is capable of opening said fuse element, thereby decoupling said voltage source from said subscriber loop line conductor.

2. The overvoltage protection circuit as recited in claim 1, wherein said fusing element comprises a low-power resistor.

3. The overvoltage protection circuit as recited in claim 1, wherein said protection device comprises a solid-state silicon-controlled rectifier (SCR) circuit arrangement.

4. The overvoltage protection circuit as recited in claim 3, wherein said biasing circuit portion includes a bipolar junction transistor (BJT) device coupled to a field effect transistor (FET) device, said BJT device and said FET device operating to drive a Zener diode that is coupled to said control gate terminal of said protection device.

5. The overvoltage protection circuit as recited in claim 4, wherein said BJT device is comprised of a PNP device having a base that is biased at a level substantially equal to said voltage source's level.

6. The overvoltage protection circuit as recited in claim 5, wherein said FET device is comprised of an N-channel enhancement mode transistor.

7. The overvoltage protection circuit as recited in claim 6, wherein a diode is coupled between said BJT device's base and emitter.

8. The overvoltage protection circuit as recited in claim 1, wherein said fusing element is coupled to said SLIC's TIP terminal and said voltage source comprises a positive voltage supply.

9. The overvoltage protection circuit as recited in claim 1, wherein said fusing element is coupled to said SLIC's TIP terminal and said voltage source comprises a negative voltage supply.

10. The overvoltage protection circuit as recited in claim 1, wherein said fusing element is coupled to said SLIC's RING terminal and said voltage source comprises a positive voltage supply.

11. The overvoltage protection circuit as recited in claim 1, wherein said fusing element is coupled to said SLIC's RING terminal and said voltage source comprises a negative voltage supply.

12. An overvoltage protection apparatus for keeping a subscriber loop line conductor from maintaining a high positive voltage in a non-ringing condition, comprising:

fusing means coupled to a terminal of a Subscriber Line Interface Circuit (SLIC) wherein said terminal is associated with said subscriber loop line conductor; and means for drawing current through said fusing means to a protected ground so as to open said fusing means when said SLIC's terminal is shorted to a voltage supply having said high positive voltage, said means for drawing current operating responsive to a biasing circuit powered by a voltage source having a level substantially equal to said high positive voltage.

13. The overvoltage protection apparatus as recited in claim 12, wherein said fusing means comprises a low-power resistor.

14. The overvoltage protection apparatus as recited in claim 13, wherein said means for drawing current comprises a silicon-controlled rectifier (SCR) circuit arrangement having a control gate coupled to said biasing circuit.

15. The overvoltage protection apparatus as recited in claim 14, wherein said biasing circuit comprises a PNP bipolar junction transistor (BJT) device whose collector is operable to drive a gate of an N-channel enhancement mode field effect transistor (FET) device, said FET device operating to draw current from said control gate of said SCR circuit arrangement.

16. A multi-point protection apparatus operable to protect a Subscriber Line Interface Circuit (SLIC) coupled to a TIP/RING pair of a subscriber loop, said loop operating to transmit voice signals and Digital Subscriber Line (DSL) signals, comprising:

a protection device coupled to at least one conductor of said TIP/RING pair, wherein said protection device is disposed between a current limiter associated with said at least one conductor and a terminal of said SLIC corresponding to said at least one conductor;

a first bias circuit portion operable to bias a control gate terminal of said protection device such that when a first transient having a level greater than a first predetermined value is imposed on said at least one conductor at said current limiter, said protection device is operable to transition into a low impedance conductive state; and a second bias circuit portion operable to bias said control gate terminal of said protection device such that when a second transient having a level grater than a second predetermined value is present near said SLIC's terminal, said protection device is operable to transition into a low impedance conductive state.

17. The multi-point protection apparatus as recited in claim 16, wherein said protection device comprises a solid-state silicon-controlled rectifier (SCR) circuit arrangement.

18. The multi-point protection apparatus as recited in claim 16, wherein said first transient has a voltage level at least greater than the sum of a peak voltage of a voice signal and a peak voltage of a DSL signal.

19. The multi-point protection apparatus as recited in claim 16, wherein said second transient has a voltage level at least greater than a supply voltage of said SLIC by a minimum value.

20. The multi-point protection apparatus as recited in claim 19, wherein said minimum value is substantially equal to about 0.7 volts.

21. The multi-point protection apparatus as recited in claim 16, wherein said first bias circuit portion includes a bipolar junction transistor (BJT) device coupled to a field effect transistor (FET) device, said BJT device and said FET device operating to drive a Zener diode that is coupled to said control gate terminal of said protection device.

22. The multi-point protection apparatus as recited in claim 21, wherein said BJT device is comprised of a PNP device having a base that is biased at a voltage level substantially equal to a supply voltage of said SLIC and said FET device is comprised of an N-channel enhancement mode transistor.

23. The multi-point protection apparatus as recited in claim 16, wherein said second bias circuit portion includes a bipolar junction transistor (BJT) device coupled to a field effect transistor (FET) device, said BJT device and said FET device operating to drive a Zener diode that is coupled to said control gate terminal of said protection device.

24. The multi-point protection apparatus as recited in claim 23, wherein said BJT device is comprised of a PNP device having a base that is biased at a voltage level substantially equal to a supply voltage of said SLIC and said FET device is comprised of an N-channel enhancement mode transistor, and further wherein said BJT device's emitter is coupled to said terminal of said SLIC corresponding to said at least one conductor.

25. The multi-point protection apparatus as recited in claim 16, wherein said first and second bias circuit portions are provided with common circuitry shared therebetween, said common circuitry including a field effect transistor (FET) device coupled to said control gate terminal of said protection device through a Zener diode.

26. The multi-point protection apparatus as recited in claim 25, wherein said first bias circuit portion includes a BJT device operable to drive said FET device, said BJT device having a base that is biased at a voltage level substantially equal to a supply voltage of said SLIC.

27. The multi-point protection apparatus as recited in claim 25, wherein said second bias circuit portion includes a BJT device operable to drive said FET device, said BJT device having a base that is biased at a voltage level substantially equal to a supply voltage of said SLIC.

* * * * *